United States Patent
Coletta et al.

(10) Patent No.: US 6,460,750 B1
(45) Date of Patent: Oct. 8, 2002

(54) FRICTION PULL PLUG WELDING: CHAMFERED HEAT SINK PULL PLUG DESIGN

(76) Inventors: Edmond R. Coletta, 4119 S. Saratoga St., New Orleans, LA (US) 70115; Mark A. Cantrell, 67529 Chris Kennedy Rd., Pearl River, LA (US) 70452

( * ) Notice: Subject to any disclaimer, the term of this patent is extended or adjusted under 35 U.S.C. 154(b) by 0 days.

(21) Appl. No.: 09/562,257

(22) Filed: May 2, 2000

Related U.S. Application Data

(60) Provisional application No. 60/160,131, filed on Oct. 18, 1999.

(51) Int. Cl.[7] .................... B23K 20/12; B23P 6/00
(52) U.S. Cl. ................ 228/2.1; 228/112.1; 29/402.01
(58) Field of Search ............ 228/112.1, 114.5, 228/119, 203, 2.1; 156/73.1; 428/940; 29/402.01, 402.18

(56) References Cited

U.S. PATENT DOCUMENTS

| | | | |
|---|---|---|---|
| RE16,599 E | 4/1927 | Mattice | |
| 3,234,643 A | 2/1966 | Hollander | |
| 3,444,611 A | 5/1969 | Bogart | |
| 3,487,530 A | 1/1970 | Ely | |
| 3,495,321 A | 2/1970 | Shaff et al. | |
| 3,848,389 A | 11/1974 | Gapp et al. | |
| 3,853,258 A | 12/1974 | Louw et al. | |
| 3,973,715 A | 8/1976 | Rust | |
| 4,087,038 A | 5/1978 | Yagi | |
| 4,144,110 A | 3/1979 | Luc | |
| 5,460,317 A | 10/1995 | Thomas et al. | |
| 5,469,617 A | 11/1995 | Thomas et al. | |
| 5,718,366 A | 2/1998 | Colligan | |
| 5,971,252 A | 10/1999 | Rosen et al. | |
| 5,975,406 A | 11/1999 | Mahoney et al. | |
| 6,045,027 A | 4/2000 | Rosen et al. | |
| 6,213,379 B1 | * 4/2001 | Takeshita et al. | ........ 228/112.1 |

FOREIGN PATENT DOCUMENTS

| | | |
|---|---|---|
| DE | 447084 | 5/1929 |
| GB | 575566 | 2/1946 |
| SU | 660801 | 5/1979 |

OTHER PUBLICATIONS

"New Process to Cut Underwater Repair Costs", TWI Connect, No. 29, Jan. 1992.

(List continued on next page.)

*Primary Examiner*—Tom Dunn
*Assistant Examiner*—Zidia Pittman
(74) *Attorney, Agent, or Firm*—Garvey, Smith, Nehrbass & Doody, L.L.C.

(57) ABSTRACT

Friction Pull Plug Welding (FPPW) is a solid state repair process for defects up to one inch in length, only requiring single sided tooling (OSL) for usage on flight hardware. Experimental data has shown that the mass of plug heat sink remaining above the top of the plate surface after a weld is completed (the plug heat sink) affects the bonding at the plug top. A minimized heat sink ensures complete bonding of the plug to the plate at the plug top. However, with a minimal heat sink three major problems can arise, the entire plug could be pulled through the plate hole, the central portion of the plug could be separated along grain boundaries, or the plug top hat can be separated from the body. The Chamfered Heat Sink Pull Plug Design allows for complete bonding along the ISL interface through an outside diameter minimal mass heat sink, while maintaining enough central mass in the plug to prevent plug pull through, central separation, and plug top hat separation.

32 Claims, 5 Drawing Sheets

OTHER PUBLICATIONS

"Spinning studs stitch up damaged welds," Innovator's Notebook,, Eureka Transfer Technology, Oct. 1991, p. 13.

"Repairing Welds With Friction–Bonded Plugs", NASA Tech. Briefs, Sep. 1996, p. 95.

"Repairing Welds With Friction–Bonded Plugs", Technical Support Package, NASA Tech. Briefs, MFS–30102, pp. 1–5 (no date available).

"2195 Aluminum–Copper–Lithium Friction Plug Welding Development,"AeroMat '97 Abstract.

"Welding, Brazing and Soldering", Friction welding section: "Joint Design", "Conical Joints", Metals Handbook: Ninth Edition, vol. 6, pp.719–738. (no date available).

* cited by examiner

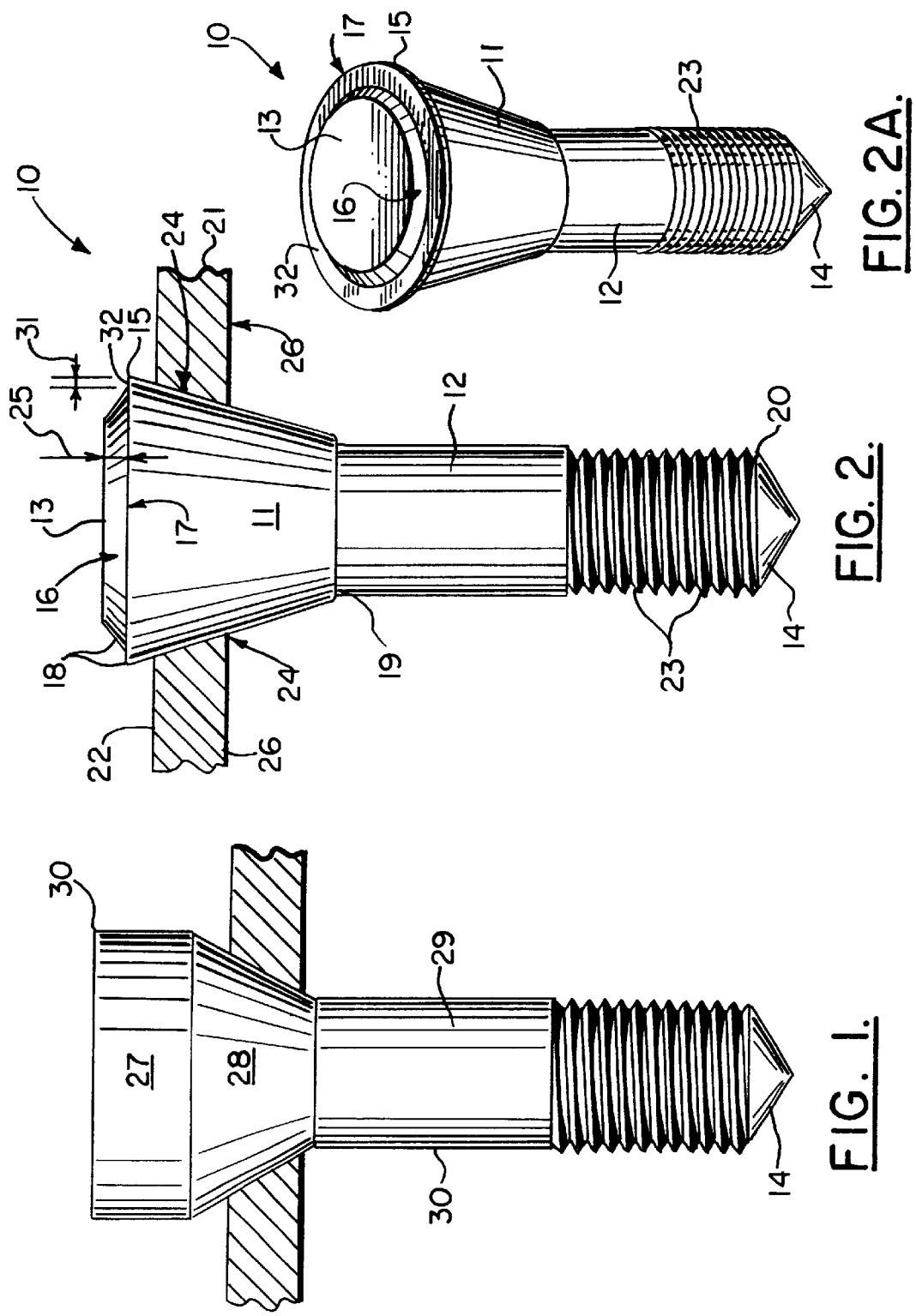

FRICTION PULL PLUG WELDING: CHAMFERED HEAT SINK PULL PLUG DESIGN

CROSS-REFERENCE TO RELATED APPLICATIONS

Priority of U.S. Provisional Patent Application Serial No. 60/160,131, filed Oct. 18, 1999, incorporated herein by reference, is hereby claimed.

The assignee is the owner of a copending patent application Ser. No. 09/141,294, filed Aug. 26, 1998, entitled "Friction Plug Welding," now U.S. Pat. No. 6,213,379 and incorporated herein by reference. For parameters not mentioned herein, see copending patent application Ser. No. 09/141,294.

STATEMENT REGARDING FEDERALLY SPONSORED RESEARCH OR DEVELOPMENT

The invention described herein was made in the performance of work under NASA Contract No. NAS8-36200 and is subject to the provisions of Section 305 of the National Aeronautics and Space Act of 1958 (42 U.S.C. Section 2457).

REFERENCE TO A "MICROFICHE APPENDIX"

Not applicable

BACKGROUND OF THE INVENTION

1. Field of the Invention

The present invention relates to friction welding. More particularly, the present invention provides an improved method and apparatus that relates to friction plug welding suitable for flight hardware usage, wherein the pull plug has an enlarged heat with a chamfered heat sink.

2. General Background of the Invention

Friction stir welding (FSW) is a solid state joining process developed by The Welding Institute (TWI), Cambridge, England and described in U.S. Pat. No. 5,460,317, incorporated herein by reference. Also incorporated herein by reference are U.S. Pat. No. 5,718,366 and all references disclosed therein.

The following references are also incorporated herein by reference: U.S. Pat. Nos. 3,853,258, 3,495,321, 3,234,643, 4,087,038, 3,973,715, 3,848,389; British Patent Specification No. 575,556; SU Patent No. 660,801; German Patent No. 447,084, "New Process to Cut Underwater Repair Costs", TWI Connect, No.29, January 1992; "Innovator's Notebook", Eureka Transfer Technology, October 1991, p. 13; "Repairing Welds With Friction-Bonded Plugs", NASA Tech. Briefs, September 1996, p. 95; "Repairing Welds With Friction-Bonded Plugs", Technical Support Package, NASA Tech. Briefs, MFS-30102; "2195 Aluminum-Copper-Lithium Friction Plug Welding Development", AeroMat '97 Abstract; "Welding, Brazing and Soldering", Friction welding section: "Joint Design", "Conical Joints", Metals Handbook: Ninth Edition, Vol. 6, p. 726.

Friction plug welding (FPW), also referred to as plug welding and friction taper plug welding (FTPW), is a process in which initial defective weld material is located, removed and replaced by a tapered plug, which is friction welded into place. This process is similar to friction stud welding, in which a plug is welded to the surface of a plate, end of a rod, or other material. The primary difference is that FPW is designed to replace a relatively large volume of material containing a defect whereas friction stud welding is a surface-joining technique.

Friction plug welding could be used to repair weld defects in a wide variety of applications; however, it would most likely be used where weld strength is critical. This is due to the fact that manual weld repairs result in strengths much lower than original weld strengths, as opposed to friction plug welds (FPWs) whose typical mechanical properties exceed that of the initial weld. In applications where high strength is not required, manual welding would be less expensive and would not require specialized equipment.

An extension of FPW is known as stitch welding or friction tapered stitch welding (FTSW) and has been developed to repair defects longer than what a single plug can eliminate. Stitch welding is the linear sequential welding of several plugs such that the last plug weld partially overlaps the previous plug. Defects of indefinite length can be repaired with this process, limited only to the time and cost of performing multiple plug welds. These welds have undergone the same testing procedures as single FPWs, including NDI and destructive evaluation. The strengths for stitch welds are similar to those for single plug welds.

Stagger stitch welding is a process best defined as stitch welding in a non-linear fashion. Areas wider than one plug length can be completely covered by staggering plugs side to side as they progress down the length of an initial weld. This process is being developed for plug welds whose minor diameter is on the crown side of the initial weld, and where replacement of the entire initial weld is desired.

While friction plug welding might be a preferred method of repairing defects or strengthening initial welds, there are some applications where heretofore it has been extremely difficult to use friction plug welding. The main cause is due to the logistics of setting up the equipment and/or support tooling to perform friction plug welding, and the geometry of the work piece to be welded.

BRIEF SUMMARY OF THE INVENTION

The apparatus of the present invention solves the problems confronted in the art in a simple and straightforward manner. What is provided is an apparatus for and a method of friction plug welding an article using a plug that has a geometry that provides less heat sink and facilitates a good weld when the plug is pulled. As demonstrated through several single variable experiments, a larger plug mass acting as a heat sink at the top of the weld has deleterious affects on the bonding of the plug top. Thermodynamically, plug mass acts to conduct heat away from the interface, while the atmosphere insulates the interface, increasing the heating capabilities of the welding process. With less plug mass, or heat sink, left on top of the plate surface after the completion of a weld, the heat produced by the weld process is not conducted away from the interface as rapidly.

Due to the nature of the Friction Pull Plug Welding process, "cold" plug material is always being pulled into a "hot" interface, with the plug shaft being the first location of the plug to be heated. This situation poses a problem to ensuring complete plug/plate interfacial bonding at the top of the weld, the last location of bonding during the welding process. Since the lack of bonding defect at the topside of the weld is easily detected through dye-penetrant non-destructive inspection, it has been thoroughly characterized and analyzed. The problem of bonding this last interfacial location is quite complex, involving a combination of both loading and heat flow.

Finite Element Thermal Modeling has demonstrated the validity of the above thesis of heat flow within the pull plug.

Two plug models have been described by the thermal model, Model 1 with 0.500 inches and Model 4 with 0.100 inches of plug mass left above the plate surface after welding. The divergence of the temperature versus distance (distance from the bottom of the plate to the top of the heat sink) curves at the region of final bonding, exhibits the effects of heat conduction. The plug with less heat sink, maintains a higher temperature at the plug top, due to atmospheric insulation and less heat conduction through plug. At a radial distance of 0.100 to 0.200 inches from the plug interface, the divergence of the curves reaches a maximum, indicating the overall importance of plug mass heat sink at this location.

Thermal modeling and experimental testing have both demonstrated the need to minimize the plug mass heat sink remaining above the plate surface to ensure complete interfacial bonding at the plug top. However, three major problems can arise from a minimized heat sink, the entire plug could be pulled through the plate hole, the central portion of the plug could be separated along grain boundaries, or with a top hat plug, the plug top hat can be separated from the body. Each of these conditions is completely unacceptable for a production acceptable process.

The forging load can completely pull a low angle plug through the plate hole because of plug overheating (i.e. does not have enough mass heat sink) or because of too little enough plug mass resistance (i.e. no top hat). A central pull-through can occur in higher angle plugs without a substantial heat sink, where the angle of the plug prevents complete plug pull through. In high angle plugs, the loading is transferred to the high heat region at a radial distance of 0.100 to 0.200 inches from the interface. The heated plug grain boundaries do not have adequate strength to support the forging load and a central plug pull-through occurs. A similar situation arises during a top hat separation, where the interfacial bonding and the geometry of the top hat, act to transfer loading to the temperature weakened plug material at the hat/plug body transition region. The forging load overcomes the shear strength of the heated grain boundaries leading to a top hat separation, which is usually followed by central plug pull-through.

The present invention includes a method of friction plug welding an article, comprising several stages. Preferably, the first stage is making a hole (that is preferably tapered) in the article to be welded. Machining a tapered hole is not necessarily required in friction plug push welding where (in certain situations generally characterized when the article to be welded is softer (having lower hardness) relative to the harder (having higher hardness) plug) the plug will form a hole, self bore or embed into the material either while rotating or not. In copending application Ser. No. 60/156,734, filed 09/30/99 and entitled "Friction Pull Plug Welding: Dual Chamfered Plate Hole", incorporated herein by reference, there is disclosed chamfered hole geometry for use in friction plug welding. A tapered plug is then inserted through the tapered hole, then the plug is attached to a chuck of a rotary tool or like motor which can both pull on the tapered plug and rotate it. Some connection means, such as threads, key grooves, flats, or locking retention interface, are provided on the tapered plug to facilitate pulling the plug with the rotary tool.

The second stage, or heating cycle is always required to weld the plug to the article. This stage preferably consists of rotating the plug while pulling (placing the plug in tension axially) into intimate contact with the hole's surface, or region surrounding the hole. The typical axial load exerted on the plug during the heating phase is between about 1000 pounds and 20,000 pounds, preferably between about 6000 pounds and 18,000 pounds, more preferably 10,000 pounds to 16,000 pounds, and most preferably 12,500 pounds to 15,000 pounds.

Other forms of heating may also be utilized, including but not limited to, using electricity to assist in the heating process, or vibrational energy such as oscillatory rotation rather than the preferred method of continuous rotation, or lateral, axial or some combination thereof, rapid displacement (such as ultrasonic welding) to impart sufficient energy to assist in the heating the weldment. The plug (preferably tapered, with a taper the same as or preferably different from the taper of the hole (if it is tapered), and rotating the plug relative to the part while moving the plug in the direction such to make contact with the hole's surface, until contact is made, and forcing the plug into the surface of the hole by pulling on the plug (imposing a tensile force in the plug in the plug's axial direction) all while continuously spinning the plug relative to the article.

The third stage is the braking stage. This rapid deceleration of rotation, if rotation is used, or otherwise defined as rapid decline of energy input to zero or near zero, is necessary to performing a successful weld. Preferably, the fourth stage which is also referred to as the forging stage, is a period of cooling in which no further heating energy is intentionally applied to the weldment and energy in the form of heat is dissipated. During this stage, it is preferable to maintain either the same axial tensile load, or a different axial tensile load whether that be greater or lesser, to cause densification and or maintain or create a sound metallurgical bond or weldment. In the current application, although not necessarily required in other applications, excess sections of the plug are cut off and material further removed via grinding and sanding to make it smooth with the initial weldment and/or surrounding materials' surfaces. The present invention also includes the plug and its upper end with chamfered heat sink.

The displacement during heating should be optimized for the specific plug geometry and hole geometry combination being welded. Empirical models can be developed to ensure that the heating displacement is great enough to enact the benefits of the "top hat", while not producing a weld with defects, such as weld pull through, lack of bonding, or grain separation.

In the preferred embodiment of the method of the present invention, a tapered hole is drilled from one side of the article being repaired. A tapered plug is then inserted through the tapered hole, then the plug is attached to a chuck of a motor which can both pull on the tapered plug and spin it. Some connection means, such as threads or locking retention interface, are provided on the tapered plug to facilitate pulling the plug.

The plug is pulled while spun by the motor. Preferably the plug is pulled also after the spinning stops, with a load the same as or different from the load while spinning. After the spinning has taken place and the plug is welded in place, the excess part of the plug is cut off and the weld machined down to make it smooth. Pulling a tapered plug during plug welding allows all equipment, including a backing plate, to be on one side of the article being welded. Pull welding eliminates the need for large backing structures that must react high loads associated with friction plug push welding, often exceeding 10,000 pounds force, while at the same loads deflect an amount often less than 0.25 inches. A hydraulically powered direct drive weld has been used; however, an electrically powered direct drive, or inertia drive flywheel weld system may also be used.

The inventors have found that satisfactory welds occur most frequently when the plug diameter is large enough to maintain a mechanically stable cool core. For this reason, plug diameters have continued to increase, and more powerful weld equipment has been acquired. Techniques have been developed to weld larger diameter plugs while minimizing the required motor power. One such finding entails varying the axial stroke rate during the weld process to decrease the initial contact friction. In this process, it is preferable for the plug and article to contact slowly, thereby reducing the rotational friction at contact. After the boundary between the plug and article plasticizes, then it is preferable, although not required, to increase the stroke rate, thereby increasing the rate of heating at the interface to achieve weld temperatures. This discovery significantly reduces the required power to perform welds, and is advantageous in performing large welds whose power requirement exceeds that which the system is designed to deliver.

The inventors have found that with their current equipment and process, the preferable operating range at which to rotate the plug is 4000–6000 rpm prior to contact between the plug and hole's surface, and it is also preferable to maintain a minimum of 3000 rpm during the duration of the heating cycle. Successful welds have been created at much slower speeds, as low as but not limited to 1000 rpm prior to contact and as high as, but limited only by the equipment capability, of about 7000 rpm prior to contact.

The plug of the present invention preferably has a connection means comprising, for example, a standard external thread. The thread can be, for example, right-hand ¾" with 16 threads per inch. Other methods for holding the plug in the chuck may also include internal threads and key grooves or like interlocking or interfitting connections.

Due to the nature of the Friction Pull Plug Welding process, "cold" plug material is always being pulled into a "hot" interface, with the plug shaft being the first location of the plug to be heated. This situation poses a problem to ensuring complete plug/plate interfacial bonding at the top of the weld, the last location of bonding during the welding process. Since the lack of bonding defect at the topside of the weld is easily detected through dye-penetrant non-destructive inspection, it has been thoroughly characterized and analyzed. The problem of bonding this last interfacial location is quite complex, involving a combination of both loading and heat flow.

Experimental data has shown that the mass of plug heat sink remaining above the top of the plate surface after a weld is completed (the plug heat sink) affects the bonding at the plug top. A minimized heat sink ensures complete bonding of the plug to the plate at the plug top. However, with a minimal heat sink three major problems can arise, the entire plug could be pulled through the plate hole, the central portion of the plug could be separated along grain boundaries, or the plug top hat can be separated from the body. The Chamfered Heat Sink Pull Plug Design allows for complete bonding along the inside skin line (ISL) interface through an outside diameter minimal mass heat sink, while maintaining enough central mass in the plug to prevent plug pull through, central separation, and plug top hat separation.

A larger plug mass acting as a heat sink at the top of the weld has deleterious affects on the bonding of the plug top. Thermodynamically, plug mass acts to conduct heat away from the interface, while the atmosphere insulates the interface, increasing the heating capabilities of the welding process. With less plug mass, or heat sink, left on top of the plate surface after the completion of a weld, the heat produced by the weld process is not conducted away from the interface as rapidly.

A chamfered heat sink pull plug design allows for complete bonding along the ISL interface through an outside diameter minimal mass heat sink, while maintaining enough central mass in the plug to pull plug failure. Experimental data has shown that complete bonding at the plug top occurs when the outside radius of the chamfered heat sink plug (LTTA (ledge top to top after) in Heating Displacement Model) is 0.00 to 0.075 inches above the plate surface at weld completion. The plug typically has a minimized heat sink band 0.050 to 0.150 inches wide around the outside diameter. From this band, the plug transitions to a 0.050 to 0.150 inch thick central chamfered heat sink.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a sectional, elevational, schematic diagram showing a pull plug with a large heat sink mass;

FIG. 2 is a sectional, elevational view of the preferred embodiment of the apparatus of the present invention showing a diagram of a pull plug with a chamfered heat sink;

FIG. 2A is a perspective view of the preferred embodiment of the apparatus of the present invention showing a diagram of a pull plug with a chamfered heat sink;

DETAILED DESCRIPTION OF THE INVENTION

Figure 4:
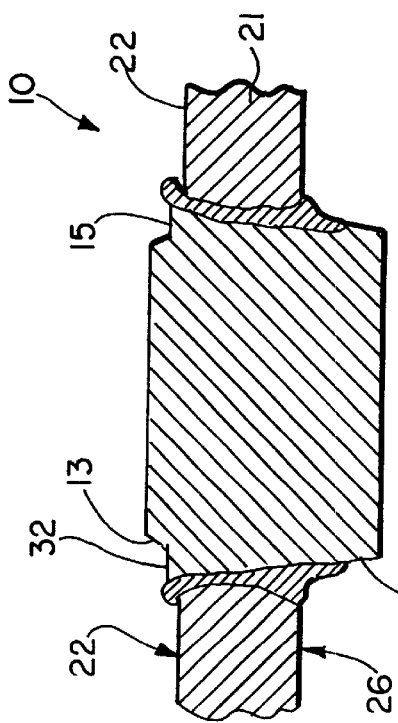
FIG. 4 is a schematic diagram illustrating a good pull plug weld (low angle pull plug with a chamfered heat sink)

FIG. 1 shows a pull plug 30 with a large heat sink mass, showing areas of hot interface and cold material when the plug 30 is pulled and rotated to produce heating and forging load. Pull plug 30 has frustoconical section 28 and shank 29 below heat sink mass 27. Such a large heat sink mass 27 can cause problems as will be discussed more fully hereinafter.

In FIGS. 2–2A, the preferred embodiment of the apparatus of the present invention is designated generally by the numeral 10. FIGS. 2–2A illustrate a diagram wherein a pull plug has been placed in position through an opening (e.g. drilled) 24 in plate 21. Plug 10 has an upper portion 18 and a lower portion 20. Plate section 21 provides upper surface 22 and lower surface 26. Upper portion 18 of plug 10 includes heat sink 13 and frustoconical section 11 that occupies opening 24. Plug 10 lower end portion 20 includes shank 12, and tip 14.

The shank 12 can have a threaded section 23 enabling connection to a rotary tool, drill or the like. In this fashion, both rotation and tension can be applied to shank 12 and thus to frustroconical section 11 of pull plug 10 as it engages opening 24.

A chamfered heat sink 13 is provided at the upper end portion 18 of pull plug 10 above frustoconical section 11. The geometry of the heat sink 13 is shown in FIG. 2. Frustoconical section 11 has an enlarged diameter section 15 with annular edge 17 that is spaced a distance (indicated by arrow 31 in FIG. 2) from the beveled annular shoulder 16 of chamfered heat sink 13. The chamfered heat sink 13 has a thickness indicated by arrow 25. An annular shoulder 19 can be provided in between shank 12 and frustoconical section 11. Generally flat annular shoulder 32 extends radially between heat sink 13 and annular edge 15.

Figure 3:
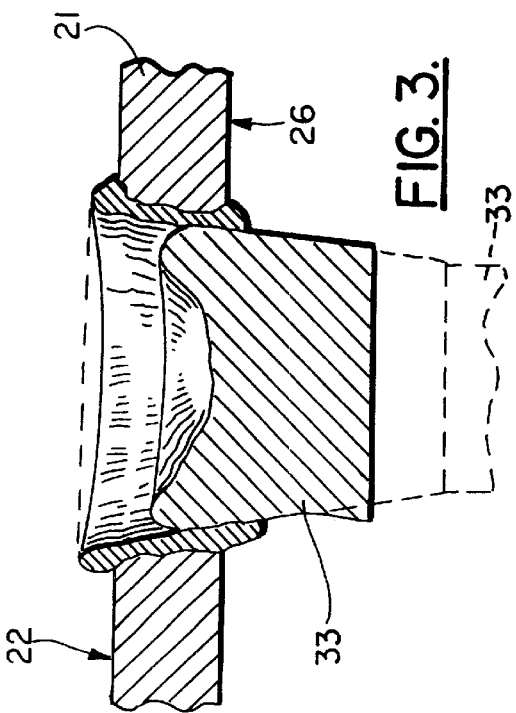
FIG. 3 is a schematic diagram exhibiting interfacial pull plug through (low angle pull plug without a chamfered heat sink)
Figure 3A:
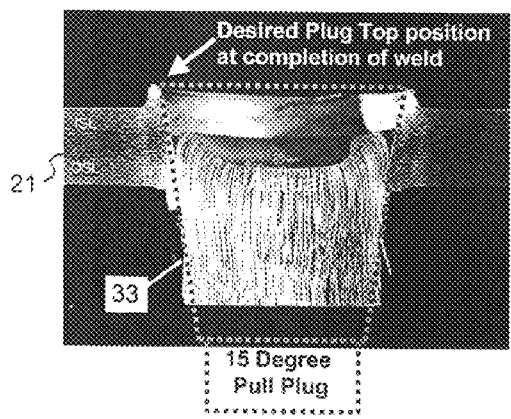
FIG. 3A is a photograph exhibiting interfacial pull plug through (low angle pull plug without a chamfered heat sink)

In FIGS. 3–3A, a sectional view and related photographic diagram illustrates an interfacial pull plug through (low angle pull plug 33 without a chamfered heat sink).

Figure 4A:
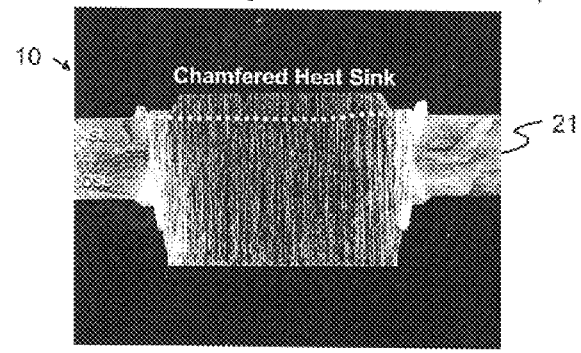
FIG. 4A is a photograph illustrating a good pull plug weld (low angle pull plug with a chamfered heat sink)

In the diagram of FIGS. 4–4A, a good pull plug weld is shown (low angle pull plug with chamfered heat sink.

Figure 5:
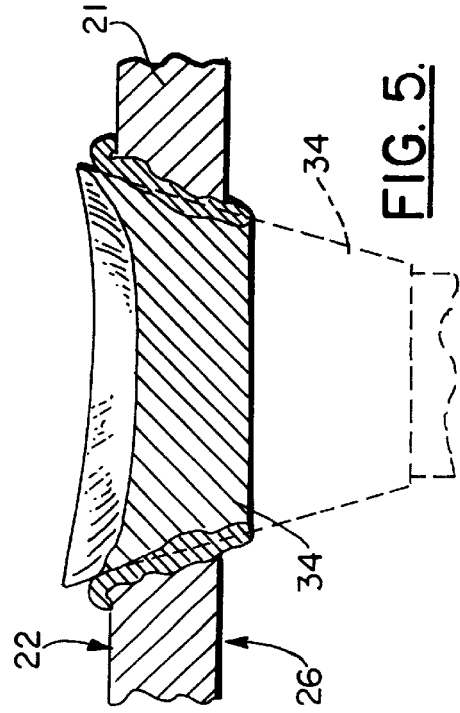
FIG. 5 is a schematic diagram illustrating central pull plug through (high angle pull plug without a chamfered heat sink)
Figure 5A:
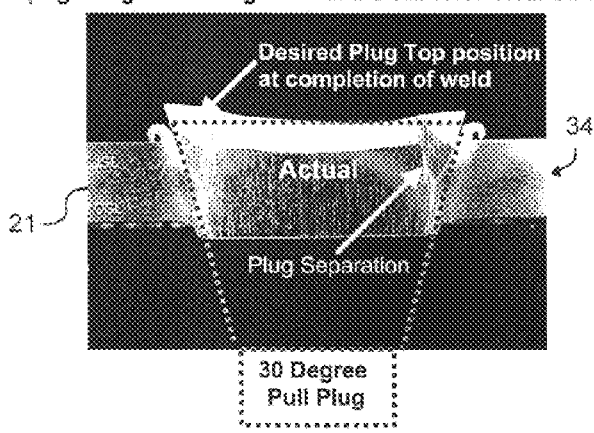
FIG. 5A is a photograph illustrating central pull plug through (high angle pull plug without a chamfered heat sink)

In FIGS. 5–5A, a diagram is shown exhibiting a central pull plug through (high angle pull plug 34 without a chamfered heat sink).

Figure 6:
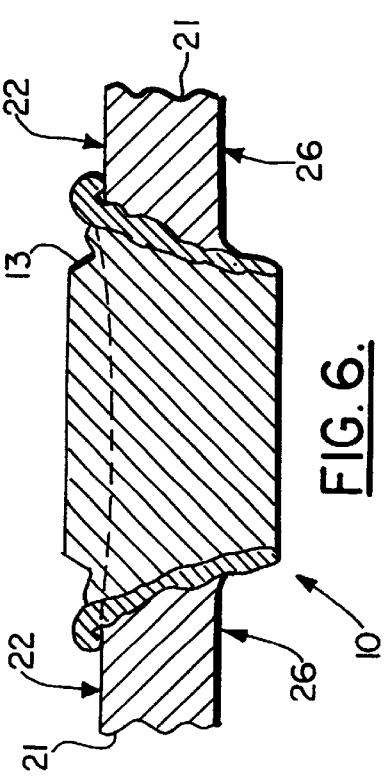
FIG. 6 is a schematic diagram exhibiting good pull plug weld (high angle pull plug with chamfered heat sink)
Figure 6A:
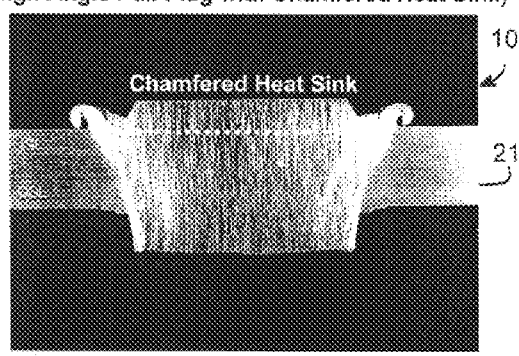
FIG. 6A is a photograph exhibiting good pull plug weld (high angle pull plug with chamfered heat sink)

In FIGS. 6–6A, the diagrams exhibits a good pull plug weld (high angle pull plug 10 with chamfered heat sink).

Figure 7:
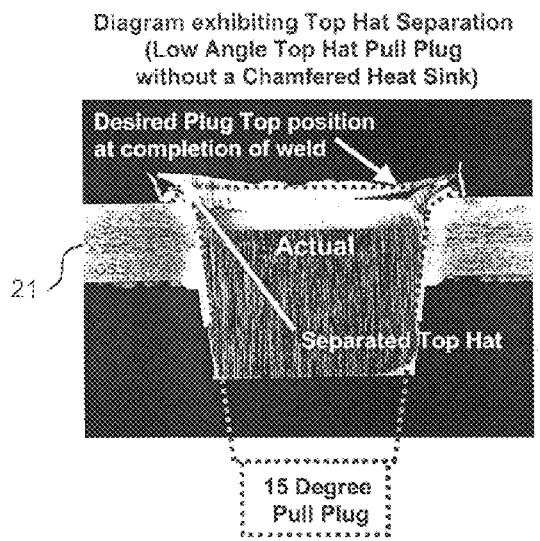
FIG. 7 is a photograph exhibiting top hat separation (low angle top hat pull plug without a chamfered heat sink)
Figure 8:
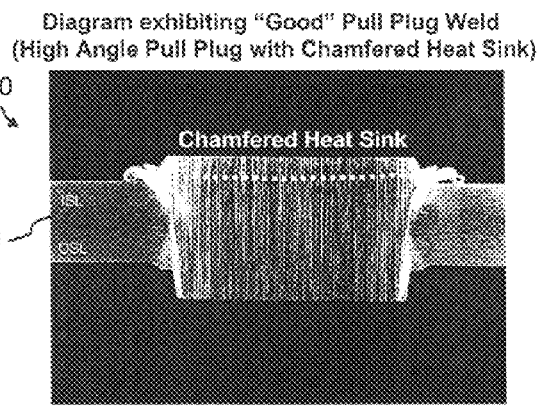
FIG. 8 is a photograph exhibiting good pull plug weld (high angle pull plug with chamfered heat sink.

FIG. 7 illustrates top hat separation, a low angle top hat pull plug 35 without a chamfered heat sink. In FIG. 8, a good pull plug weld is shown (high angle pull plug 10 with chamfered heat sink).

Friction plug welding hole geometries are an important factor to creating a successful weld. The current hole is made by mechanically removing the weld bead flush to the top and bottom sides or the surrounding plate or sheet, drilling a pilot hole, and counter sinking with a counter sink cutter. The current included angle is typically 20° to 120°, preferably 40° to 90°, and most preferably 40° to 60°, although it is possible to perform similar welds with no angle (a straight bored hole), or opposite bored tapers (those which the taper of the plug and hole are opposing each other). The hole is drilled to a depth such that the minor diameter is 0.00" to 0.200" greater in diameter than the diameter of the plug's shaft. The major diameter of the plug is typically equal to or greater than the major diameter of the hole. Current shaft diameters have ranged from ⅝" to ¾" in diameter; however, diameters ranging from between 1" and 1.5" are planned. Current plug major diameters (the diameter on the larger side of the taper) typically range from 1" to 1.35", but have been made less than ¾" and may be made in excess of 1.5". The plug body included angle, before the annular surface transition to the top hat, ranges from 10° to 90°, most preferably between 15° to 60°.

Tension applied to a plug is preferably 6000–18,000 lbs, more preferably 10000–15000 lbs, and most preferably 12500–15000 lbs. During the application of such tension, the plug 10 or 10A is preferably rotated at least 4,000 revolutions per minute, more preferably at least 5000 RPM, most preferably at least 6000 RPM, and perhaps even higher with proper equipment. The inventors have found that reliability and robustness increase with increasing RPM.

The forging phase for typical weld geometry exerts an axial tensile load of typically 1000 pounds to 20,000 pounds, preferably 6000 pounds to 16,000 pounds, more preferably 8000 pounds to 15,000 pounds, and most preferably 12,000 pounds to 14,000 pounds, as the weld cools. After several seconds, (typically less than one minute, preferably about 5 seconds), the weld has cooled sufficiently to remove the tensile load and remove the tooling and weld equipment The advantage of pulling instead of pushing is that all equipment can be placed on one side of the object being repaired (such as the rather large and fragile external tank of the space shuttle). This makes the logistics of performing a plug weld much easier in some cases than if standard plug push welding were to be performed.

The typical maximum temperature for this process, using typical process parameters, using aluminum alloys is 900° F. as measured by an embedded thermocouple located within 0.100" from the original interface at an approximate depth of 33% to 50% through the substrate's thickness. The first cycle ends after a pre-programmed time (typically less than 5 seconds, preferably from 0.25 seconds to 2 seconds, more preferably from 0.5 seconds to 2 seconds, and most preferably in about 1 second), displacement during heating (also referred to as 'bum-off') (typically 0.010 inches to 0.5 inches, preferably 0.150 inches to 0.400 inches, more preferably 0.200 inches to 0.350 inches, and most preferably 0.250 inches to 0.300 inches), or temperature (typically 500° F. to 1000° F., preferably 700° F. to 1000° F. as measured with an imbedded thermocouple within 0.1" of the original interface buried up to a depth of about 50% through the substrate's thickness.

The backing support (also referred to as a pressure foot or collet) is another important aspect in forming a successful weld. It reacts the axial load, and also serves as a restraint to forge the extruded flash. The depth, diameter and profile of this support are optimized for each set of conditions, e.g. weld parameters, plug/hole geometrical design, plate thickness, etc., and is important in creating a defect-free weld. In the pull method, the backing support (also referred to as a pressure foot) consists of a collet of an appropriate diameter and geometry. Currently, the diameter of the collet is larger than the shaft of the plug that passes through it by at least 0.002", typically from 0.002" to 0.400", and preferably from 0.100" to 0.325". The profile of the collet may include a bevel, taper, groove or other type of depression to act as a reservoir for plasticized material to flow. Successful welds have been made with tapered backing supports, with a taper angle between 0° and 60°, most typically between 20° and 40°.

The present inventors use or contemplate using plug welding (push and/or pull) with 2195 Al—Cu—Li alloy and 2219 Al—Cu alloy. Development of plug welding includes plugs (for example) of extruded Al—Cu—Li 2195 in the T3, T8, and T8 overage condition welded into (1) Al 2195-T8 sheet, extrusion and plate, (2) 2195-T8/2195-T8 fusion welded sheet, extrusion and plate with Al 4043 filler wire, (3) 2195-T8/2219-T8 fusion welded sheet, extrusion and plate with Al 4043 filler wire, (4) 2219-T8/2219-T8 fusion welded sheet, extrusion and plate with Al 4043 filler wire, (5) 2219-T8/2219-T8 fusion welded sheet, extrusion and plate with Al 2319 filler wire, (6) friction stir welded 2195-T8/2195-T8 sheet and plate, where all sheets and plates were of thicknesses greater than 0.12" and no greater than 1.00" and all plugs were a diameter between 0.500" and 1.500".

The chamfered heat sink pull plug design allows for complete bonding along the ISL interface through an outside diameter minimal mass heat sink, while maintaining enough central mass in the plug to pull plug failure. Experimental data has shown that complete bonding at the plug top occurs when the outside radius of the chamfered heat sink plug (LTTTA (ledge top to top after) in heating displacement Model) is 0.00 to 0.075 inches above the plate surface at weld completion. The plug typically has a minimized heat sink band (see arrow 31) 0.050 to 0.150 inches wide around the outside diameter. From this band, the plug transitions to a 0.050 to 0.150 inch thick central chamfered heat sink (see arrow 25).

The main application of the friction pull plug welding chamfered heat sink plug design is for solid state repair welding of welded pressure vessels utilized in the aerospace industry. This process would be useful in any application where a defect free, high strength, circular weld of about 1" diameter is required. The process could also be readily utilized to repair the Friction Stir Welding exit keyhole on circumferential welds. Other applications could be found throughout the automotive, aircraft, marine, and aerospace industries.

The FPPW Chamfered Heat Sink Plug Design is directly applicable to welding in all other metallic alloy systems or metal matrix composites.

This application could be utilized in all other alloy systems or metal matrix composites.

PARTS LIST

The following is a list of parts and materials suitable for use in the present invention:

| Part Number | Description |
| --- | --- |
| 10 | pull plug |
| 11 | frustoconical section |
| 12 | shank |
| 13 | heat sink |
| 14 | tip |
| 15 | enlarged diameter section |
| 16 | beveled annular shoulder |
| 17 | annular edge |
| 18 | top portion |
| 19 | annular shoulder |
| 20 | lower portion (OSL) |
| 21 | plate section |
| 22 | upper surface (ISL) |
| 23 | threaded section |
| 24 | opening |
| 25 | thickness |
| 26 | lower surface (OSL) |
| 27 | heat sink mass |
| 28 | frustoconical section |
| 29 | shaft |
| 30 | pull plug |
| 31 | spacing arrow |
| 32 | annular shoulder |
| 33 | pull plug |
| 34 | pull plug |
| 35 | pull plug |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A friction plug welding repair apparatus including:
   a) a first structural member;
   b) a second structural member;
   c) a welded connection that joins the first and second structural members together at a weld;
   d) an opening through the weld having opposed ends and an opening central axis;
   e) a pull plug repair member that can be fitted to the opening using plug welding, the plug having a plug central axis;
   f) the plug having a beveled surface that forms an angle with the plug central axis, a maximum diameter portion at one end and a chamfered heat sink at said maximum diameter portion; and
   g) a pulling device that is connectable to the plug at one end portion thereof, enabling the plug to be pulled into a selected repair position that occupies the opening.

2. The friction plug welding repair apparatus of claim 1 wherein the opening is about one inch (1") in diameter.

3. The friction plug welding repair apparatus of claim 1 wherein the opening is less than one inch in diameter.

4. The friction plug welding repair apparatus of claim 1 wherein the opening is a drilled opening.

5. The friction plug welding repair apparatus of claim 1 wherein the plug can be pulled into the opening with a tensile portion of the plug that is opposite said maximum diameter portion.

6. The friction plug welding repair apparatus of claim 1 wherein the plug has a transverse end portion that carries said chamfered heat sink.

7. The friction plug welding repair apparatus of claim 1 wherein the plug is comprised of a first end portion having a smaller diameter and a second end portion having said larger diameter portion, wherein the larger diameter portion includes a generally frusto-conically shaped section and the chamfered heat sink.

8. A friction plug welding repair apparatus including:
   a) a first structural member;
   b) a second structural member;
   c) a weld that joins the first and second structural members together, the weld having a defect to be repaired;
   d) an opening through the weld at the defect that removes the defect, the opening having opposed ends and an opening central axis;
   e) a pull plug repair member that can be fitted to the opening using plug welding, the plug having a plug central axis and first and second end portions;
   f) the plug having a beveled surface that forms an angle with the plug central axis, a maximum diameter portion at the first end portion and a chamfered heat sink at said maximum diameter section; and
   g) a pulling device that is connectable to the plug at the second end portion, enabling the plug to be pulled into a selected repair position that occupies the opening.

9. The friction plug welding repair apparatus of claim 8 wherein the opening is about one inch (1") in diameter.

10. The friction plug welding repair apparatus of claim 8 wherein the opening is less than one inch in diameter.

11. The friction plug welding repair apparatus of claim 8 wherein the opening is a drilled opening that removes the weld defect.

12. The friction plug welding repair apparatus of claim 9 wherein the pulling device pulls the plug into the opening with a tensile portion of the plug that is opposite said maximum diameter portion.

13. The friction plug welding repair apparatus of claim 8 wherein the plug has a transverse end portion that carries said chamfered heat sink.

14. The friction plug welding repair apparatus of claim 8 wherein the plug is comprised of a first end portion having a smaller diameter and a second end portion having said larger diameter portion, wherein the larger diameter portion includes a generally frusto-conically shaped section and the chamfered heat sink.

15. A friction plug welding repair apparatus including:
   a) a first structural member;
   b) a second structural member;
   c) a weld that joins the first and second structural members together, the weld having a defect to be repaired;
   d) an opening through the weld at the defect having opposed ends and an opening central axis;
   e) a pull plug that can be fitted through the opening, the plug having a geometry;
   f) wherein the opening has a geometry that differs from geometry of the plug, one end of the plug having a heat sink that includes a tapered annular surface; and
   g) a pulling device that is connectable to the plug generally opposite the heat sink, enabling the plug to be simultaneously pulled and deformed into a selected repair position that occupies the opening.

16. The apparatus of claim 15 wherein the pulling device transfers sufficient heat to the plug to cause it to flow.

17. A friction plug welding repair apparatus including:
   a) a first structural member;
   b) a second structural member;
   c) a welded connection that joins the first and second structural members together at a weld;
   d) an opening through the weld having opposed ends and an opening central axis;
   e) a pull plug repair member that can be fitted to the opening using plug welding, the plug having a plug central axis, a lower end and an upper end;
   f) the plug having a beveled surface that forms an angle with the plug central axis, a maximum diameter portion at the upper end and a chamfered heat sink extending upwardly from said maximum diameter portion; and
   g) a pulling device that is connectable to the plug at one end portion thereof, enabling the plug to be pulled into a selected repair position that occupies the opening.

18. The friction plug welding repair apparatus of claim 17 wherein the opening is about one inch (1") in diameter.

19. The friction plug welding repair apparatus of claim 17 wherein the opening is less than one inch in diameter.

20. The friction plug welding repair apparatus of claim 17 wherein the opening is a drilled opening.

21. The friction plug welding repair apparatus of claim 17 wherein the plug can be pulled into the opening with a tensile portion of the plug that is opposite said enlarged diameter portion.

22. The friction plug welding repair apparatus of claim 17 wherein the plug has a transverse end portion that carries said chamfered heat sink.

23. The friction plug welding repair apparatus of claim 17 wherein the plug is comprised of a first end portion having a smaller diameter and a second end portion having said larger diameter portion, wherein the larger diameter portion includes a generally frusto-conically shaped section and the chamfered heat sink.

24. A friction plug welding repair apparatus including:
   a) a first structural member;
   b) a second structural member;
   c) a weld that joins the first and second structural members together, the weld having a defect to be repaired;
   d) an opening through the weld at the defect that removes the defect, the opening having opposed ends and an opening central axis;
   e) a pull plug repair member that can be fitted to the opening using plug welding, the plug having a plug central axis and first and second end portions;
   f) the plug having a beveled surface that forms an angle with the plug central axis, a maximum diameter portion at the first end portion that includes a transversely extending portion and a chamfered heat sink on said maximum diameter section that is entirely contained within said transversely extending portion; and
   g) a pulling device that is connectable to the plug at the second end portion, enabling the plug to be pulled into a selected repair position that occupies the opening.

25. The friction plug welding repair apparatus of claim 24 wherein the opening is about one inch (1") in diameter.

26. The friction plug welding repair apparatus of claim 24 wherein the opening is less than one inch in diameter.

27. The friction plug welding repair apparatus of claim 24 wherein the opening is a drilled opening that removes the weld defect.

28. The friction plug welding repair apparatus of claim 24 wherein the pulling device pulls the plug into the opening with a tensile portion of the plug that is opposite said enlarged diameter portion.

29. The friction plug welding repair apparatus of claim 24 wherein the plug has a transverse end portion that carries said chamfered heat sink.

30. The friction plug welding repair apparatus of claim 24 wherein the plug is comprised of a first end portion having a smaller diameter and a second end portion having said larger diameter portion, wherein the larger diameter portion includes a generally frusto-conically shaped section and the chamfered heat sink.

31. A friction plug welding repair apparatus including:
   a) a first structural member;
   b) a second structural member;
   c) a weld that joins the first and second structural members together, the weld having a defect to be repaired;
   d) an opening through the weld at the defect having opposed ends and an opening central axis;
   e) a pull plug having upper and lower end portions, that can be fitted through the opening, the plug having a geometry that includes maximum diameter portion having a generally transversely extending surface;
   f) wherein the opening has a geometry that differs from geometry of the plug, one end of the plug having a heat sink at the transversely extending surface that includes a tapered annular surface; and
   g) a pulling device that is connectable to the plug generally opposite the heat sink, enabling the plug to be simultaneously pulled and deformed into a selected repair position that occupies the opening.

32. The apparatus of claim 31 wherein the pulling device transfers sufficient heat to the plug to cause it to flow.

* * * * *